356-150
1-8-74 XR 3,784,289
SR

United States Patent [19]

Wicker

[11] 3,784,289

[45] Jan. 8, 1974

[54] METHOD AND APPARATUS FOR HIDING AND VIEWING HALFTONE IMAGES

[75] Inventor: Ralph C. Wicker, Fairport, N.Y.

[73] Assignee: American Bank Note Company, New York, N.Y.

[22] Filed: July 26, 1971

[21] Appl. No.: 167,058

Related U.S. Application Data

[62] Division of Ser. No. 856,663, Sept. 10, 1969, Pat. No. 3,675,948.

[52] U.S. Cl. .................. 350/321, 356/150

[51] Int. Cl. .................. G02b 27/00

[58] Field of Search .................. 350/14, 15, 30, 94, 350/321; 356/238, 150

[56] References Cited

UNITED STATES PATENTS

| | | | |
|---|---|---|---|
| 2,059,197 | 11/1936 | Backer et al. | 356/71 |
| 3,256,770 | 6/1966 | Wicker | 356/150 |
| 3,425,770 | 2/1969 | Mueller et al. | 356/71 |
| 3,599,147 | 8/1971 | Rogers | 356/71 |

*Primary Examiner*—David Schonberg
*Assistant Examiner*—Michael J. Tokar
*Attorney*—Robert S. Dunham

[57] ABSTRACT

A method of halftone printing is disclosed which permits an image to be disguised or hidden in a printed field from detection by ordinary photography or the eye of a viewer and an apparatus is presented which can be used to bring out or detect the hidden image. The printed field comprises three halftone components: an overall halftone at a given angle; a second halftone at a different angle and containing a negative of the image; and the image itself in halftone at a third angle and coincident with the negative portion of the second halftone. When each of the halftones is made up of dot figures of similar size, period and tone, the field will give a uniform appearance to the eye, obscuring the image and resisting photographic analysis except by impractical magnification.

5 Claims, 10 Drawing Figures

METHOD AND APPARATUS FOR HIDING AND VIEWING HALFTONE IMAGES

CROSS REFERENCE

This is a division of application Ser. No. 856,663 filed Sept. 10, 1969, 3,675,948.

An apparatus in the form of a screen made up of a periodic pattern of similar frequency to that of the halftone screen of the printed field and arranged at the proper angle to the printed field, will reveal the hidden image at a different brightness than the background. By moving the properly arranged screen in an appropriate manner relative to the printed field, the hidden image will appear as a blinking image. If the method and apparatus are used in printing and checking security documents, additional printing techniques are disclosed for preventing counterfeiting of the documents such as black overprinting, slight variations in the print angle from the conventional angles and the use of unique and complicated dot figures and images.

BACKGROUND OF THE INVENTION

The present invention relates to the printing or lithographic art and more particularly to a method and apparatus for producing and viewing an image hidden in a halftone field.

The technique of halftone printing are well known in the printing art. They consist essentially of photographing the picture or figure to be reproduced, through a screen and using the screened photograph to etch the printing plate. The printing surface of the plate thus contains the picture to be reproduced in the form of a pattern of dot figures which correspond to the dot figures in the screen and which may be in the form of circles, squares, triangles or the like. The printed picture is then composed of corresponding regularly arranged lines of dot figures and is referred to as a "halftone." To achieve different effects in the printed picture, variations may be made in the density of the screen, that is, the dot size and spacing; the color and tone of the ink, and the angle at which the lines of dots are arrayed. A single picture may be produced using more than one halftone pattern by arranging the component halftones at differnt angles.

It has been found in printing the various components in a halftone picture at different angles, that certain light interference effects called "moire effects," may occur which cause waviness, blotching and other distortions in the printed picture. As a result of this phenomenon, it has become conventional to print the various components in a halftone picture at different angles of approximately thirty degrees displacement from each other so that, for example, in multi-color printing, the red component of the picture may be printed at forty-five degrees, the yellow component at seventy-five degrees and the blue component at 105° with respect to the upper margin.

Halftone printing is widely used and is the technique primarily used in multicolor reproduction and for producing the patterns and figures on security documents, such as currency, bonds, stock certificates and the like. While documents printed in this manner are somewhat difficult to duplicate or counterfeit, still in the past few techniques have been found to prevent those skilled in the art from producing counterfeits which resist being readily distinguishable or identifiable from the original documents.

The present invention provides a method of halftone printing which permits a distinctive image to be hidden in a halftone field in such manner as to prevent detection by the unaided eye or ordinary photographic techniques, and also provides a suitable apparatus which may be used to quickly bring out the hidden image. The invention has many diverse applications and is particularly useful in the security documents field as it renders documents so printed resistant to counterfeiting and permits ready identification of valid documents and detection of invalid duplicates.

SUMMARY OF THE INVENTION

The printing method of the present invention comprises the production of a halftone field composed of: an overall halftone printed at a given angle; a second halftone printed at a different angle and containing a negative of the image to be hidden; and the image itself printed in halftone at a third angle and coincident with the negative portion of the second halftone.

The three halftone components are made up of dot figures having similar frequencies so that a printed field or rosette pattern is formed which gives a uniform appearance to the eye, obscuring the image. Using ordinary halftone frequencies such as 100 or 150 dot figures to the inch, the hidden image also will resist photographic analysis as the optical magnification required to distinguish the various components would be impractical under most circumstances. The image may be readily detected, however, by the use of the apparatus of the present invention which comprises a screen made up of a periodic pattern of similar frequency as the halftones and capable of being arranged at the same angle as the halftones. When such a screen is arranged at the angle of the halftone screen of the hidden image, the hidden image can be made to appear as a bright image against a darker background. Alternatively, when the screen is arranged at the same angle as the halftone screen of the background, the hidden image can be made to appear as a darker image against a brighter background. At either orientation when the screen is moved parallel to the periodic pattern the brighter image will appear to blink.

To further confound attempts at duplication or counterfeiting of articles and documents printed in this manner, even using the apparatus of the invention, a black overprint may be added to the three components in the halftone field and the print angle of the three components may be varied somewhat from the conventional thirty degree displacement without causing objectionable moire effects. Also, a solid over printing color of the same reflection density as the printed document may be used. In addition, unusual dot configurations may be used and the hidden image may be of a unique or complicated form. Also, a like color can be over printed at a different angle and/or a different frequency to present a serious moire problem to the potential counterfeiter.

DETAILED DESCRIPTION OF THE INVENTION

Figure 1:
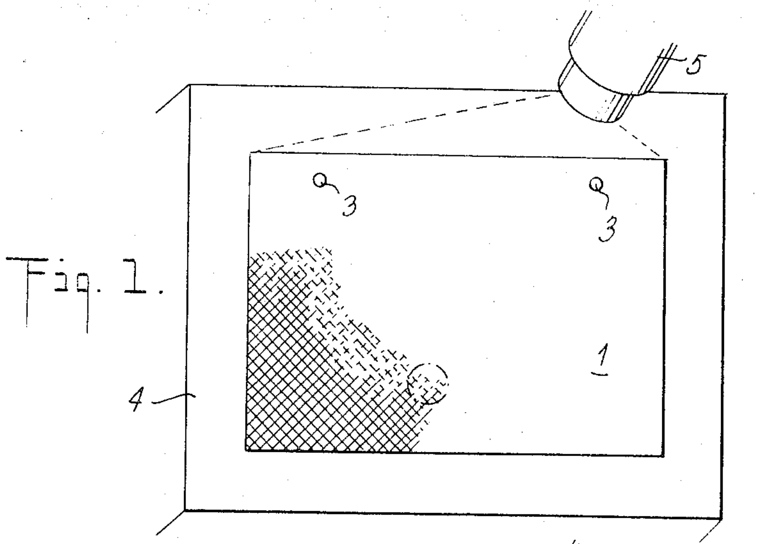
FIG. 1 shows a light table with a sheet of film disposed thereon containing a halftone arranged at an angle of forty-five degrees with respect to the upper margin, and which is used in producing one component of the printed field of the present invention.

The basic technique of producing a halftone print consists of photographing the picture or figure to be reproduced through a screen and using the screened photograph to etch the surface of the printing plate. The printing surface of the plate thus contains the picture to be reproduced in the form of a pattern of dot figures which correspond to the dot figures in the screen. The different components of a composite halftone print are produced by successively photographing the picture with the screen arranged at different angles. If the picture is to be printed in a single color, all of the components may be etched, using the succession of photographs, on a single plate and when a multicolor reproduction is made, each photograph is used to etch an individual corresponding plate. The method of the present invention will first be described in connection with printing a halftone field of a single color and then in connection with a multicolor field. While certain particular steps will be described for performing the method of the present invention, since the photographic art lends itself to the use of various combinations of negatives and positives in different sequences to produce the same ultimate result, those skilled in the art will see numerous equivalent laternative steps which may be used in performing the method of the present invention.

HIDDEN IMAGE

Firstly, a large sheet of commercially available film is obtained containing a negative or a positive pattern of a halftone screen. For example, the screen pattern may be composed of square dot figures having a density of 40 percent and a frequency of 100 per inch, that is, the film will contain a positive of the screen, the dots being transparent, and the opaque areas in between them covering 40 percent of the total area of the film. It should be understood in this regard that the screen patterns shown in the drawings are illustrative representations to be used in explaining the invention and therefore lack the exact physical properties and visual qualities of the screens and printed halftones which are actually used, since it is the intention of the invention that in actuality the halftones obscure analysis. The drawings then are intended to provide some impression of the actual visual effects while still aiding in the understanding of the invention.

Figure 1A:
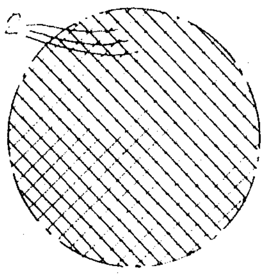
FIG. 1*a* is an enlarged view of a portion of the film of FIG. 1 showing the halftone in detail.

Now, in the first step, a section is cut from the large sheet of film in the shape of, but slightly larger than the size of the printing plate to be produced, such as in the form of the rectangular sheet 1 shown in FIG. 1. The lines of dots 2, of the screen pattern are arranged at an angle of 45 degrees with the upper margin as illustrated in detail in FIG. 1*a*. Two registration holes 3 may be punched near the upper margin in the portion of the cutout sheet 1 which is in excess of the size of the printing plate. The cutout sheet 1 is then placed on a light table 4 as shown in FIG. 1, registered, and a reverse picture is made by exposing a sheet of film in a contact vacuum frame 5. The cutout sheet 1 is then removed from the light table 3 in preparation for the second step.

Figure 2:
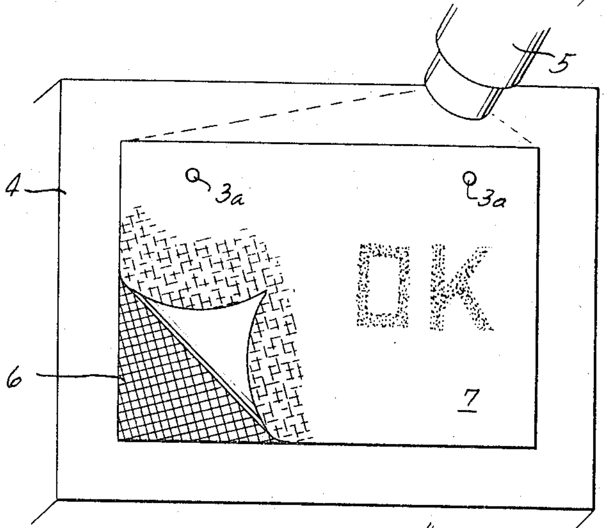
FIG. 2 shows two sheets of film disposed on the light table, the upper one being transparent except for the opaque characters OK and the lower one containing a halftone arranged at an angle of seventy-five degrees with the upper margin, and which provides another component of the printed field of the present invention.

A second section is cut from the film in the shape and size of the first cutout sheet 1, but with the lines of dots 2 on the screen arranged at an angle of 75° with the upper margin (FIG. 2). Two registration holes 3a are again punched near the upper margin of this cutout sheet and the sheet 6 is placed on the light table 4 with the registration holes 3*a* positioned in coincidence with the positioning of the registration holes 3 of the first sheet 1.

A sheet of transparent film 7 is now obtained in the shape of the first two cutout sheets, 1 and 6, and registration holes 3*a* are punched in this film. This sheet of film 7, contains a positive pattern of the image which is to be hidden. For our purposes, the image will be in the form of the letters OK as shown in FIG. 2. The transparent sheet of film 7 is then placed on the light table 4 on top of and in registration with the second cutout sheet 6 and a second exposure of the film in the contact vacuum frame 5 is made. The film in the contact vacuum frame 5 will now contain coincident negatives of the overall 45° halftone and the 75° halftone with a blank of the letters OK in the latter negative. The two sheets of film 6 and 7 are then removed from the light table 4 in preparation for the third step.

Figure 3:
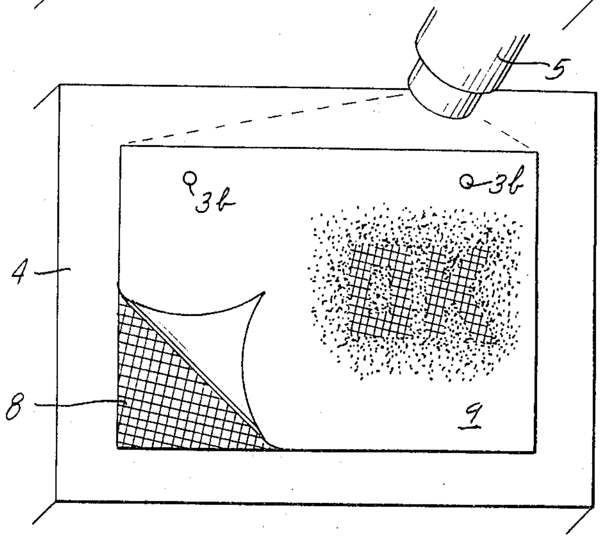
FIG. 3 shows another two sheets of film on the light table, the upper one being opaque except for a transparent portion in the form of the characters OK and the lower one containing a halftone arranged at an angle of 105° with the upper margin and which provides a further component of the field of the present invention.

A third section is cut from a large sheet of film in the shape and size of the first two cutout sheets, 1 and 6, but having the lines of dots 2 of the screen arranged at an angle of 105° with the upper margin. The registration holes 3*b* are punched in the upper margin and the sheet 8 is placed in registration on the light table 4 as shown in FIG. 3.

A sheet of film 9 is the reverse of the transparent sheet 7 used in the second step, that is, opaque, except for a transparent portion in the image OK, is then obtained and registration holes 3*b* punched in its upper margin. To check that this film 9 is a perfect reversal of sheet 7, the sheet 7 may be placed in registration on the light table 4 and the reversal sheet 9 placed in registration over it. The combination of the two sheets 7 and 9, should provide a completely opaque field on the light table 4. After checking, the transparent sheet 7 is removed and the reversal sheet 9 is placed over the sheet 8 which is screened at 105°. A third exposure is then made of the film in the contact vacuum frame 5, which will impress a negative of the 105° screen only in the areas of the image OK. The 105° screen image will occur exactly within the negative areas of the image produced during the second exposure.

Figure 4:
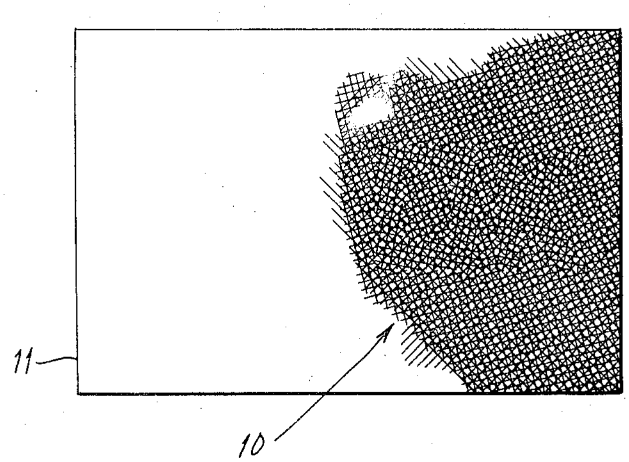
FIG. 4 shows an article printed with a representation of the composite halftone field of the present invention.

The film containing the composite negative of the three screen patterns is then used to etch a printing plate and a representation of the halftone field 10 printed on an article 11 with the plate is shown in FIG. 4. The combination of the three screen patterns printed at different angles produces what appears to the eye to be a uniform halftone field 10. The image of the letters OK screened at 105°, will be hidden from the eye in the uniform field 10. At a halftone period of 100 or 150 dots per inch, (much greater than that shown in FIG. 4) the image will defy analysis by ordinary magnification methods. While it is conceivable that the halftone could be enlarged to the point where analysis would be possible, such analysis would be completely impractical with existing equipment.

Using a single plate, the halftone field 10 must, of course, be printed in one color. However, images may also be hidden in this manner in multi-color halftone fields as long as there is no great difference in the density and tone of the various screen pattern components. For example, a field printed with red, green and yellow components of similar tone and each of a density of 40 percent will produce a continuous gray rosette pattern to the eye of a viewer, so that the particular color used in printing a hidden image is not discernible. Of course, if the image is printed in a darker tone and at a much greater density than the other components of the field, it would become discernible to a viewer.

The steps to be followed in producing a multicolor halftone field are essentially the same as those described above in connection with the single color field 10, except that separate negatives are made of each of the screen pattern components and these negatives are used to etch individual plates. The individual plates are then used in sequence to print the separate colors in forming the composite halftone field.

VIEWING APPARATUS

Figure 5:
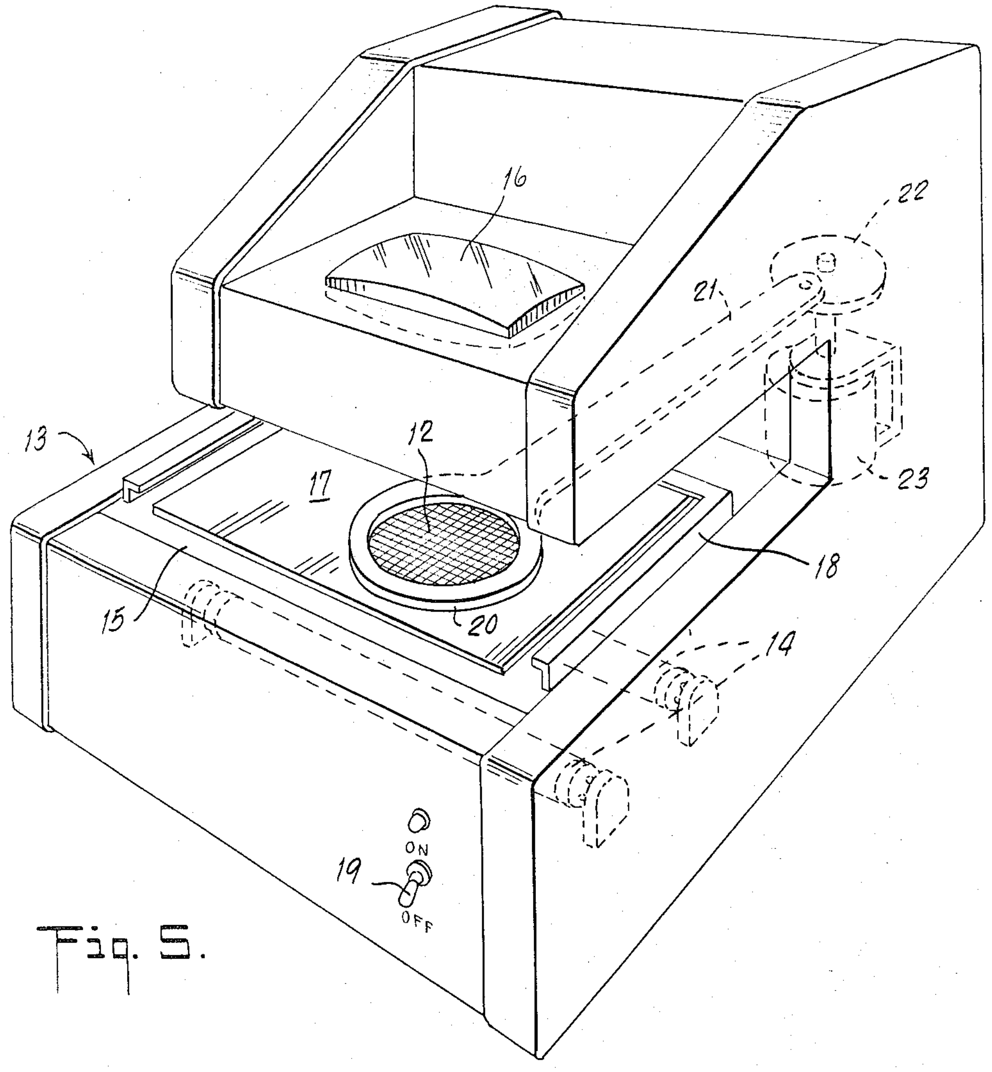
FIG. 5 is a perspective view of an apparatus which may be used to view the hidden image on a document printed in the manner of the present invention.
Figure 6:
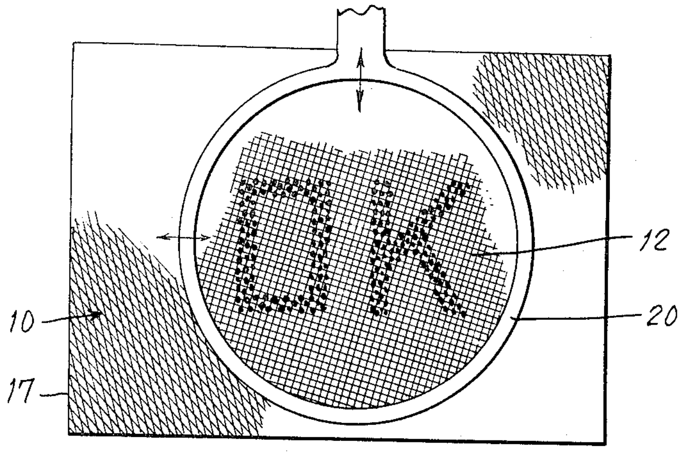
FIG. 6 shows a representation of the hidden image on a document being viewed by the apparatus.

Now that the image has been hidden in the halftone field 10 and resists detection by the eye or photographic analysis, it is of little value unless its presence can be utilized in some way. One type of apparatus for readily bringing out the hidden image in the halftone field 10 is shown in FIG. 5. The essential component of this apparatus is a periodic screen 12 of approximately the same frequency as the components of the halftone field 10. A screen of this sort might be cut from the large sheet of film which was originally used in producing the components of the halftone field. The lines of apertures 2 on the detecting screen 12 are arranged at the same angle with the upper margin as the lines of dots of the screen 8 which produced the image, in the present case, at 105 degrees. When the detecting screen 12 is held in registration over the halftone field 10 and moved across the field, 10 as shown in FIG. 6, the resulting light interference magnification effects will bring out a blinking image of the letters OK to the eye of a viewer.

While it will be seen that pictures containing hidden images may be used in combination with the detecting screen 12 in many diverse applciations, such as in games, advertising displays and article marking, a particularly useful and preferred application is in the printing of security documents to resist unauthorized duplication or counterfeiting. The apparatus shown in FIG. 5 is particularly intended for use in inspecting security documents printed in the manner of the present invention. The apparatus may comprise a light table portion 13, having two fluorescent lights 14 mounted below a translucent plate 15, and a viewing lens 16 with the detecting screen 12 disposed between it and the light table 13. The illumination may also be directed downwardly upon the document and through the detecting screen overlying the document. On the other hand, the illuminated document, whether illuminated from below or above can be projected through a suitable lens with projected image viewed through a movable halftone screen of proper frequency and orientation. A person wishing to determine whether a document, for example, a traveller's check 17 presented for payment, contains the hidden image and is therefor valid, would insert the check into the apparatus. The check 17 is placed on the surface of the translucent plate 15 with its upper edge in abutment with a registration tab 18, so that the individual halftone components will be arranged at their given angles with respect to the plate margin. The two lights 14 below the plate 15 are then turned on by means of a switch 19, presenting a bright image of the check 17 to a person viewing it through the viewing lens 16 disposed above the table 13. The detecting screen 12 which will be arranged at the same angle as the image halftone on the check 17 is mounted in a holder 20, supported by an arm 21 whose opposite end is connected to an eccentric wheel 22. The wheel 22 is driven by an appropriate motor 23. The motor 23 may be operated by the switch 19 that turns on the lights 14, so that, when the switch 19 is thrown, the detecting screen 12 will be moved back and forth across the check 17 on the table 13. If the check 17 has been printed with the hidden image, a person looking through the viewing lens 16 will see a blinking image of the letters OK somewhat as indicated in FIG. 6. Counterfeits will present no image.

COUNTERFEIT PREVENTING MEASURES

Figure 8:
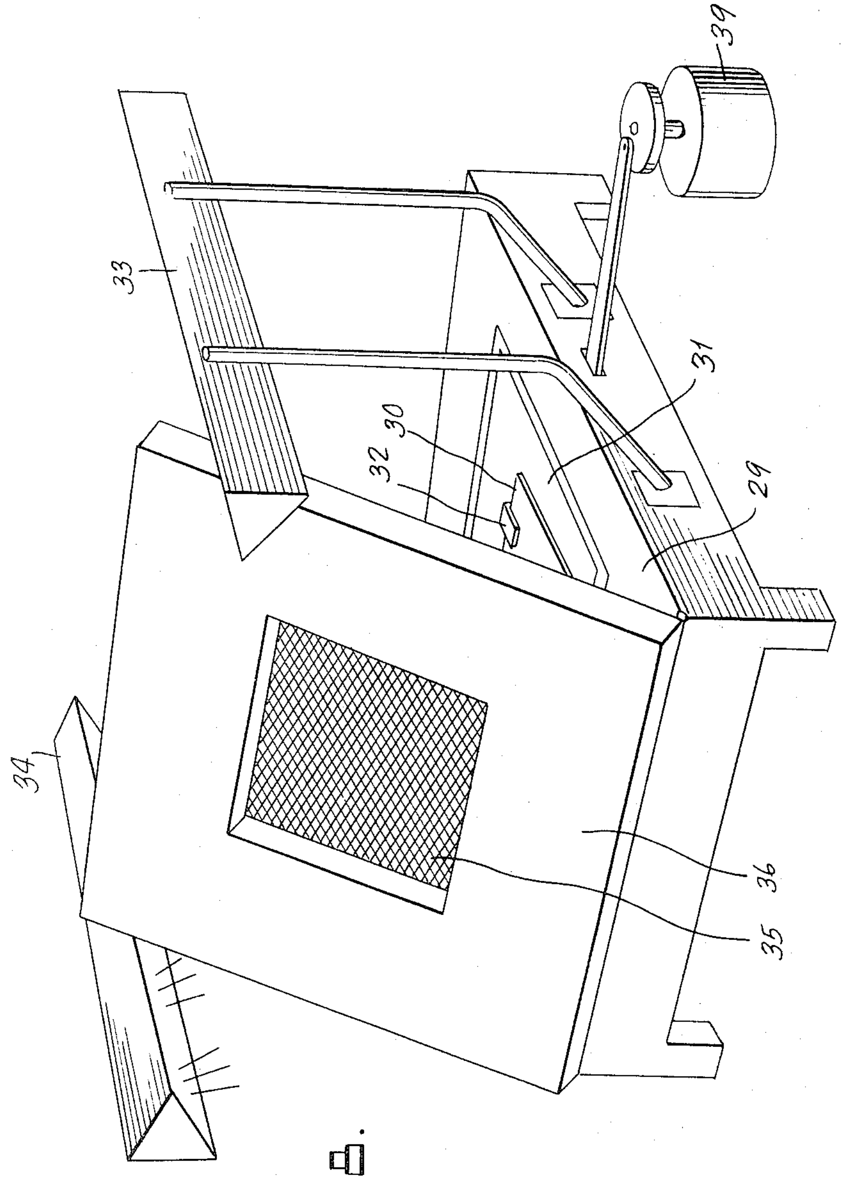
FIGS. 8 and 9 are modifications of the apparatus employing surface illumination of the document.
Figure 9:
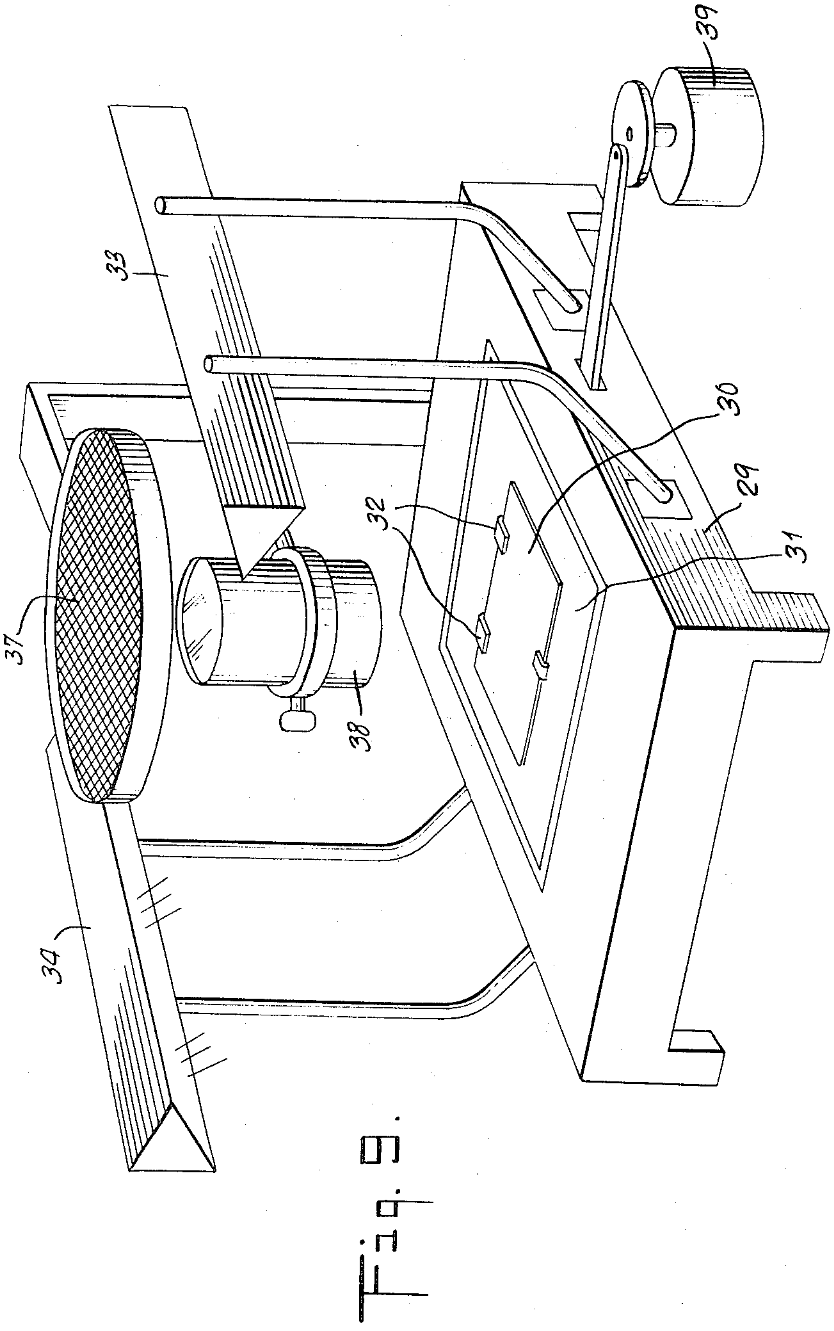

Alternative apparatus is shown in FIGS. 8 and 9 wherein a security document such as a check 30 is placed on platform 29 having an opaque plate 31 with registration tabs 32. Illumination from lights 33 and 34 above the platform, is directed toward the document from a 45 ° angle. In FIG. 8, the moire screen 35 is mounted in a hinged frame 36, to permit the screen to be placed directly upon the check, the screen being hinged to permit the placing of the check in registration, and removal therefrom after examination. In FIG. 9, the moire screen 37 is located at a predetermined distance above the plate 32, in parallel relation, and a projection lens 38 projects an image of the check 30 in the plane of the moire screen of the same size. In either apparatus a vibrator to vibrate the plate in a horizontal plane may be provided as is indicated at 39.

Figure 7:
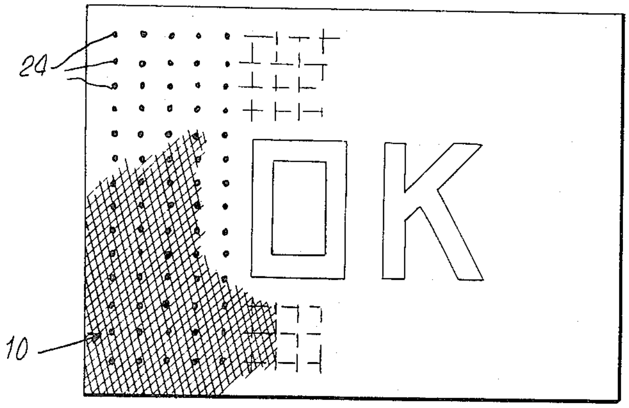
FIG. 7 shows the document of FIG. 6 printed with an additional black over print arranged at ninety degrees with respect to the upper margin.

It will be realized that while security documents printed in the manner already discussed would resist duplication by an unknowing counterfeiter, still one familiar with the techniques of the present invention could reproduce documents printed in this manner without too much difficulty. For example, documents printed in a single color could be duplicated by even an unknowing counterfeiter by photographing the document in toto and etching a single plate from the photograph which would necessarily contain the image hidden in the halftone field. While this could not be done with a multicolor document, it might be possible to analyze the hidden image using the detecting screen. A further step which may be employed in the method of the present invention to confound the counterfeiter, is the use of a black overprint as shown in FIG. 7. A document printed in the manner of the check 17 of FIG. 6 is also printed with a black halftone screened at 90 ° with respect to the upper margin. The dot FIGS. 24 of this halftone may be of the same size, but preferably are much larger than those of the three component and different frequency halftones. A counterfeiter, in attempting to photograph individual halftone components by screening out the remaining components, in the case of a single color, or filtering them out when different colors are used, must contend with the black overprint. Each of the component photos, or exposures of a single-color document will contain parts of the black overprint, as well as the particular component screen pattern so that the resulting plate or plates will produce a halftone field on the counterfeit document which appears much darker or more dense than the field of the original document. If the halftone field is printed in three colors, and therefore, three photographs must be made, using appropriate color filters, each of the photographs will contain an image of the black overprint as the black cannot be filtered out. The reproduction in this case will generally not only be darker than the original but will also contain various moire effects, since each component will contain an image of the black halftone in its own color, but screened at a different angle.

A further step to resist counterfeiting of the halftone field is to displace the component halftones at other than 30 ° angles. As previously mentioned, in halftone printing if the various halftone components are not properly displaced, a moire effect will occur, which will result in a blotching, waviness, or other irregularities in the composite halftone field. However, in multicolor printing, it is possible to vary the displacement of the components somewhat from the 30 ° displacement without encountering the moire effects. When using neutral colors, it is generally only possible to vary the displacement from 30 ° by plus or minus a half degree, but with the regular colors, the displacement may be as much as plus or minus two degrees before a moire will appear. Thus, a person attempting to duplicate a halftone field must print in exact registration with the original components and if the registration is just slightly off, a moire pattern will appear, or the field will have a somewhat different appearance from the original. Such a shift in the printing of a duplicate will show up better if the original field is of a heavy density, rather than of a low density.

It is also possible to print a solid color over the halftone field and still bring out the blinking hidden image using the detecting screen. The solid color may even be the same as that used in printing the halftone or a solid black; the only requirement being that the solid color be of the same or close to the printing density of the hidden image background. As long as the inks used are translucent, the interference magnification effect will "lift out" the halftone of the hidden image, rendering it detectable to the eye.

A method of halftone printing is thus presented wherein an image may be hidden in a halftone field resisting detection by the eye or a camera but which may be readily detected by the use of a halftone screen apparatus. The method produces a halftone field which resists duplication and also embodies the use of a black overprint and varying of the displacement angle of the halftone components in the field to foil counterfeiting. In addition, halftone screens with unusual dot configurations and hidden images in unique or complicated form may be used to render duplication practically impossible.

What is claimed is:

1. Apparatus for viewing a hidden halftone image comprising an article whose surface is printed with an overall halftone at a given angle, a second halftone at a different angle from said overall halftone and containing blank portions in the form of said image, and a third halftone in the form of said image at an angle different from the angles of said overall and second halftones and in register with said blank portions in said second halftone, two of said halftones being printed at approximately 30° angles with respect to the other halftone and all of said halftones being of a similar density and tone, that is having a period greater than 100 lines per inch and being of a similar dot size and degree of brilliance and saturation with respect to a grey scale;

a halftone screen of similar periodicity to the three halftones; and means for mounting said halftone screen adjacent said article surface and for reciprocal movement with respect to the third halftone on the article surface.

2. Apparatus for viewing a hidden halftone image comprising:

a translucent article having a surface on which an overall halftone is printed at a given angle, a second halftone is printed at a different angle from said overall halftone and contains blank portions in the form of said image, and a third halftone in the form of said image is printed at an angle different from the angles of said overall and second halftones in register with said blank portions in said second halftone, two of said halftones being printed at approximately 30° angles with respect to the other halftone and all of said halftone having a period greater than 100 lines per inch and being of a similar dot size and degree of brilliance and saturation with respect to a grey scale;

means for holding the article in a fixed orientation; means for shining light through the article while held in said fixed orientation; a halftone screen of similar periodicity to the three halftones;

means for mounting said halftone screen adjacent said article surface and disposed in the path of the light shining through said article; and means for reciprocally moving said screen across the path of the light shining through said article.

3. Apparatus for revealing a hidden halftone image comprising:

an article whose surface is printed with an overall halftone at a given angle, a second halftone at a different angle from said overall halftone and containing blank portions in the form of said image and a third halftone in the form of said image at an angle different from the angles of said overall and second halftones and in register with said blank portions in said second halftone, two of said halftones being printed at approximately 30° angles with respect to the other halftone and all of said halftones being of a similar density and tone, that is, having a period greater than a 100 lines per inch and being of a similar dot size and degree of brilliance and saturation with respect to a grey scale;

means for supporting the article with its surface in a given plane;

a periodic screen of similar density to the three halftones;

means for mounting said screen in a plane parallel to that of the article surface and opposite said third halftone;

illuminating means for shining light on the third halftone on said article surface and arranged such that said light passes through said periodic screen; and means for producing relative reciprocal movement between the periodic screen and said article surface in their respective planes.

4. Apparatus for revealing a hidden halftone image comprising:

an article whose surface is printed with an overall halftone at a predetermined angle with respect to a given datum, a second halftone at a different angle from said overall halftone and containing blank portions in the form of said image at an angle different from the angles of said overall and second halftones and in register with said blank portions in said second halftone, two of said halftones being printed at approximately 30° angles with respect to the other halftone and all of said halftones being of a similar density and tone, that is, having a period greater than 100 lines per inch and being of similar dot size and degree of brilliance and saturation with respect to a grey scale;

means for supporting the article with one of said halftones in register with said given datum;

a periodic screen of similar density to the three halftones;

means for mounting said periodic screen at the same angle as said third halftone with respect to the given datum and opposite the third halftone;

illuminating means for shining light on the third halftone on said article surface and disposed such that said light passes through said periodic screen; and means for producing relative reciprocal movement between the periodic screen and said article surface so that the angle between said periodic screen and said third halftone is varied.

5. Apparatus for viewing a hidden halftone image comprising:

an opaque article having a surface on which an overall halftone is printed at a given angle, a second halftone is printed at a different angle from said overall halftone and contains blank portions in the form of said image, and a third halftone in the form of said image is printed at an angle different from the angles of said overall and said second halftones in register with said blank portions in said second halftone, two of said halftones being printed at approximately 30° angles with respect to the other halftone and all of said halftones having a period greater than 100 lines per inch and being of similar dot size and degree of brilliance and saturation with respect to a grey scale;

means for holding the article in a fixed orientation;

means for illuminating the surface of the article while the article is held in said fixed orientation;

a periodic screen of similar density to the three halftones;

means for supporting said periodic screen adjacent said article surface and disposed in the path of the light reflected from said article surface;

a lens for focussing the reflected light from said third halftone on the surface of the article upon the periodic screen; and means for reciprocally moving the periodic screen in a plane parallel with respect to the plane of said article surface.

* * * * *